Patented Apr. 20, 1926.

1,581,819

UNITED STATES PATENT OFFICE.

WILHELM SIEGEL, OF BERLIN-CHARLOTTENBURG, GERMANY.

PROCESS OF MANUFACTURING SODIUM FLUORIDE FROM SILICOFLUORINE COMPOUNDS.

No Drawing. Application filed May 9, 1925. Serial No. 29,223.

*To all whom it may concern:*

Be it known that I, WILHELM SIEGEL, citizen of Germany, and residing at Berlin-Charlottenburg, State of Prussia, Germany, have invented certain new and useful Improvements in Processes of Manufacturing Sodium Fluoride from Silicofluorine Compounds, of which the following is a specification.

This invention has reference to the manufacture of sodium fluoride from silico-fluorine-compounds, and it is intended, as compared with the previous art, to facilitate and cheapen the course of manufacture, and to adapt the treatment to all kinds of raw material. As the most suitable compounds for starting the reaction referred to silico-hydrofluoric acid or a salt of said silico-hydrofluoric acid, the sodium salt for instance, may be used. Silico-hydrofluoric acid is obtained as a waste product in various industries, for instance, in the manufacture of superphosphate-fertilizers and in the purification of graphite. For the purposes of this invention the silico-hydrofluoric acid may be used as the starting compound either as the free acid, or the sodium salt may be used which is manufactured therefrom by means of sodium-chloride, and which presents the advantage of being more readily adapted for shipment than the free dilute acid.

As heretofore practised, in order to obtain sodium fluoride from sodium-silico-fluoride it was usual to directly decompose the salt last mentioned by means of sodium-carbonate, which results in a mixture of sodium-fluoride and silicic acid. The separation of these two compounds from each other requires very large quantities of water on account of the very low degree of solubility of the sodium-fluoride with the consequent necessity of subsequent evaporation of the great volume of water. This previous process is, therefore, very expensive and in a great many cases it cannot be carried out on a large scale in view of these and other economic reasons.

Now, in accordance with my invention, the expedient is used of obtaining the sodium-fluoride by the intermediate formation of the potassium salt of the silico-hydrofluoric acid, and for this purpose any suitable potassium salts, such as potassium-chloride, and the crude salts of the potash industry, such as sylvine or carnallite may be employed, and these salts are allowed to act either upon the silico-hydrofluoric acid or upon the sodium-silico-fluoride. The potassium-silico-fluoride thus obtained is then caused to react with a potassium compound of alkaline reaction, such as potassium-carbonate or potassium-bircarbonate or potassium-hydrate, by which means silicic acid, carbonic acid and the comparatively easily soluble potassium-fluoride are formed. This potassium-fluoride salt may be separated from the silicic acid by means of comparatively small amounts of water, inasmuch as it is readily soluble, and since the silicic acid by this treatment is precipitated in a condition in which it may be washed out with surprising facility. The potassium-fluoride obtained is then decomposed by means of a suitable sodium-compound, such as sodium-carbonate, or bicarbonate or sodium-hydroxide, and the desired sodium-fluoride is thereby obtained, together with potassium-carbonate or bicarbonate of potassium or caustic potash. The equations hereinafter submitted illustrate the reactions, in case potassium-carbonate and sodium-carbonate are being employed by way of exemplification:—

I. $K_2SiF_6 + 2K_2CO_3 = 6KF + SiO_2 + 2CO_2$
II. $6KF + 3Na_2CO_3 = 6NaF + 3K_2CO_3$

Part of the resulting carbonate or bicarbonate or hydroxide of potash may reenter the process and may be used over again in the cycle for the decomposition of new quantities of potassium-silico-fluoride.

Inasmuch as it appears from the first equation that in the reaction of potassium-silico-fluoride with potassium-carbonate only two molecules of this compound are required, while according to the second equation three molecules are formed, the return of the required amounts of potassium-carbonate or of bicarbonate or hydroxide of potassium into the process will still leave a balance of one molecule in each case which may be withdrawn as a salable commercial product. The sodium-fluoride according to Equation II is substantially free of silicic acid, and may be directly disposed of as a salable commercial product.

*Example.*

1000 liters of a dilute solution of silico-hydro-fluoric acid containing for instance 50 kilogrs. $H_2SiF_6$ are treated with a solid potassium-salt containing 55 kilogrs. KCl, or with a corresponding amount of a concentrated solution of a potassium-salt. The liquid is stirred and allowed to settle. Then wash by decantation, and the thus purified potassium-silico-fluoride, preferably without being previously dried, is decomposed in the same container with a strong solution of 92.5 kilogrs. potassium-carbonate, while agitating the mixture and preferably heating the same. The resulting solution of potassium-fluoride is separated from the eliminated silicic acid, thus for instance by a suction pump or the like or by means of the filter press. The liberated free carbonic acid may be utilized, if desired. The solution of potassium-fluoride obtained is stirred with 103 kilogrs. sodium carbonate of 98% either in the cold or heated. The comparatively difficultly soluble sodium-fluoride will separate out and in the solution there remains potassium-carbonate with small amounts of sodium-fluoride. The eliminated sodium-fluoride, after being washed out, may be submitted to centrifugal action and dried. From the solution of potassium-carbonate this salt is obtained in the usual manner by evaporation, crystallization and further treatment.

In case of the bicarbonates or the free hydroxide being used instead of carbonate of potassium and sodium the quantities employed will have to be changed in equivalent proportions. The reactions will then take place according to the following equations:—

III. $K_2SiF_6 + 4KHCO_3 = 6KF + SiO_2 + 4CO_2 + 2H_2O$

IV. $K_2SiF_6 + 4KOH = 6KF + SiO_2 + 2H_2O$

V. $6KF + 6NaHCO_3 = 6NaF + 6KHCO_3$

VI. $6KF + 6NaOH = 6NaF + 6KOH$.

The sodium-fluoride obtained according to this process is purer than any other commercial product of the kind heretofore obtained, and it is, therefore, particularly adapted for the manufacture of cryolite, as well as for the manufacture of enamels and for other purposes where purity and particularly freedom from silicic acid are of importance.

In the exemplification of the process hereintofore set forth silico-hydrofluoric acid has been referred to as the starting compound which may be obtained as a waste product in many industries. Wherever such silico-hydrofluoric acid is not available it may be obtained from fluor-spar in the well-known manner by means of sulphuric acid and with the addition of silicic acid or substances containing silicic acid, the impure kinds of flour-spar which are otherwise only difficulty adapted for utilization, being preferably employed with advantage both from the industrial as well as economic point of view. The silico-hydrofluoric acid thereby obtained may be used in the same manner, as heretofore described. The process makes it possible, therefore, to start with quite impure raw material and to arrive at a finished product of a particularly high degree of purity in a most advantageous manner by obtaining at the same time a very valuable by-product.

Although my invention has been hereinbefore described in connection with a specific example of its application, it is not intended that the details presented are to be regarded as limitations upon the scope of the invention, except in so far, as intended in the accompanying claims.

What I claim is:—

1. The process of obtaining sodium-fluoride, which consists in treating potassium silico-fluoride with an alkaline potassium compound, separating the potassium-fluoride obtained from the silicic acid formed, treating the potassium-fluoride with a sodium compound, thereby changing the potassium-fluoride into sodium-fluoride, and separating the latter from the potassium compounds.

2. In the process of producing sodium-fluoride decomposing potassium-fluoride with an alkaline sodium-salt, and separating the comparatively difficultly soluble sodium-fluoride from the alkaline potassium salt obtained.

3. The process of producing sodium-fluoride, which consists in treating silico-fluorine-compounds with a potassium salt, thereby forming silico-potassium-fluoride, treating and decomposing the latter with alkaline potassium compounds, separating the resulting potassium fluoride from the silicic acid formed, and treating and decomposing the potassium-fluoride with alkalin sodium compounds, and separating the sodium-fluoride formed from the potassium salts.

4. The process of producing sodium-fluoride, which consists in treating silico-hydrofluoric acid with a potassium salt, thereby forming silico-potassium-fluoride, treating and decomposing the latter with an alkaline potassium compound, separating the resulting potassium-fluoride from the silicic acid formed, and treating and decomposing the potassium-fluoride with an alakline sodium compound, and separating the sodium-fluoride formed from the remaining alkaline potassium salt formed by decomposition.

5. The process of producing sodium-fluoride, which consists in treating silico-potassium-fluoride with a carbonate of potash, separating the resulting potassium-fluoride from the silicic acid formed, and treating and decomposing the potassium-fluoride with a carbonate of sodium, and separating the sodium-fluoride formed from the potassium salts.

6. The process of obtaining sodium-fluoride, which consists in heating potassium-silico-fluoride with an alkaline potassium compound, separating the potassium-fluoride obtained from the silicic acid formed, and heating the potassium-fluoride with a sodium salt, thereby changing the potassium-fluoride into sodium-fluoride, and separating the sodium-fluoride from the other products.

WILHELM SIEGEL.